United States Patent [19]

Keyes, IV et al.

[11] Patent Number: 4,834,473
[45] Date of Patent: May 30, 1989

[54] HOLOGRAPHIC OPERATOR DISPLAY FOR CONTROL SYSTEMS

[75] Inventors: Marion A. Keyes, IV, Chagrin Falls; William L. Thompson, Montville, both of Ohio

[73] Assignee: The Babcock & Wilcox Company, New Orleans, La.

[21] Appl. No.: 844,400

[22] Filed: Mar. 26, 1986

[51] Int. Cl.[4] .............................................. G02B 27/22
[52] U.S. Cl. .................................... 350/3.6; 350/144; 358/88
[58] Field of Search ........................ 350/3.6, 3.66, 3.7, 350/6.3, 144; 358/2, 90, 287, 88; 376/248; 381/40

[56] References Cited

U.S. PATENT DOCUMENTS

| | | | |
|---|---|---|---|
| 3,813,685 | 5/1974 | St. John | 358/2 |
| 4,315,281 | 2/1982 | Fajans | 358/88 |
| 4,359,758 | 11/1982 | Teacherson | 358/90 |
| 4,376,950 | 3/1983 | Brown et al. | 350/3.6 |
| 4,566,031 | 1/1986 | Kirk | 358/90 |
| 4,631,751 | 12/1986 | Anderson et al. | 358/287 |

OTHER PUBLICATIONS

Naegele, "Spinning Lens Projects Updatable 3-D Image", *Electronics*, Oct. 21, 1985, pp. 21-22.
Simon et al, "A Spinning Mirror Auto-Stereoscopic Display," *SPIE Three-Dimensional Imaging*, vol. 120, 1977, pp. 180-183.
Mark et al, "Three-Dimensional Viewing of Tomographic Data—The Tomax System," SPIE, vol. 120, Three-Dimensional Imaging (1977), pp. 192-194.
Newswanger et al, "Large Format Holographic Stereograms and Their Applications," SPIE, vol. 523: *Applications of Holography* (1985), pp. 26-32.

*Primary Examiner*—Rodney B. Bovernick
*Assistant Examiner*—Martin Lerner
*Attorney, Agent, or Firm*—Vytas R. Matas; Robert J. Edwards

[57] ABSTRACT

A technique for producing a three-dimensional holographic display which is updatable in real time is disclosed. A spinning lens device intercepts a two-dimensional display on a projection television receiver and transforms same into a three-dimensional holographic display in free space. The holographic display is modifiable by the control room operator and process control variables can be readily superimposed thereon.

12 Claims, 1 Drawing Sheet

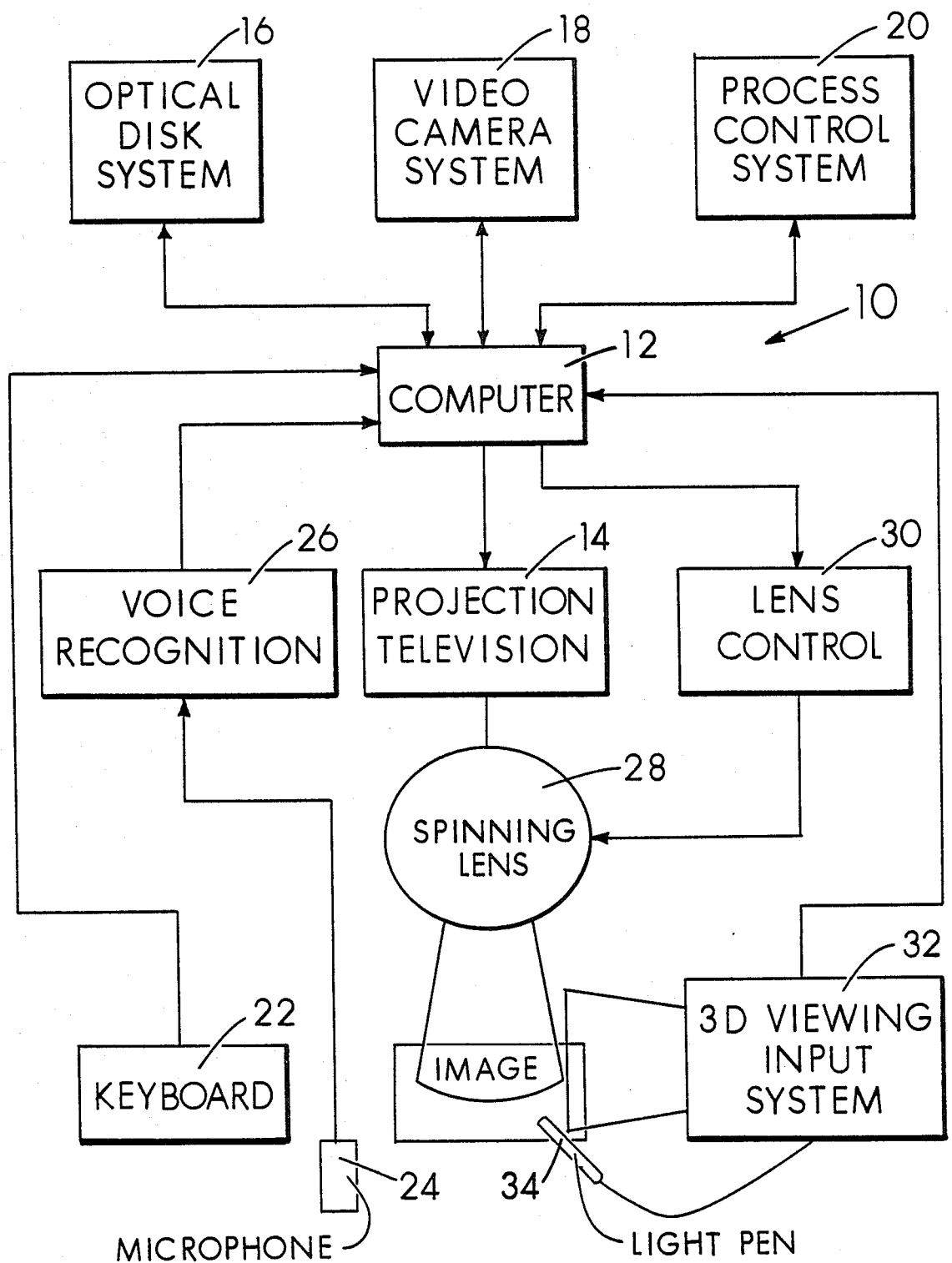

HOLOGRAPHIC OPERATOR DISPLAY FOR CONTROL SYSTEMS

TECHNICAL FIELD

The present invention relates generally to an operator display for a control room, and more particularly to a control room operator display that uses holographic techniques to provide a display in free space in front of the operator.

BACKGROUND ART

Process control room installations typically have several operator consoles each employing a large number of individual displays (such as CRT displays) to reflect the status of various process parameters or to monitor the operation of the process control system. The control room operator must be very familiar with the operation of the overall control system so as to be able to properly interpret the various readings and graphics shown on the displays. Recently, holographic techniques have been utilized to provide a three-dimensional CRT display so as to assist the operator in visualizing and interpreting the graphics representing the process parameters being monitored. Typically, however, these holographic displays are not readily updatable in real time, process variable information is not superimposable thereon, and the operator cannot easily interact with the display to modify same. The availability of process control information superimposed on holographic display and the ability of the operator to interact with the holographic display are extremely helpful to the operator in grasping the status of the process being controlled and in initiating measures to correct or modify the operation of the process control system.

Because of the foregoing, it has become desirable to develop a holographic display for control rooms wherein the display is updatable in real time, process control information can be superimposed thereon and the operator can easily interact with the holographic display.

SUMMARY OF THE INVENTION

The present invention solves the aforementioned problems associated with the prior art as well as other problems by providing a three-dimensional holographic display which is readily updatable in real time. The holographic display is generated in free space in front of the operator by means of a spinning lens device which intercepts a two-dimensional image on a projection television receiving and transforms same into a holographic three-dimensional display. The image shown on the projection television receiver is controlled by a computer and may include image data for the graphics to be generated by the computer, video images of particular physical areas associated with the process being monitored, and data relating to process control variables. In this manner, process control variable information can be superimposed on the holographic display in real time. The operator can interact with the holographic display by means of a keyboard, a voice recognition device, or a light pen which can be located at a desired point within the holographic display and actuated in conjunction with the voice recognition device. Thus, the operator can easily interact with the holographic display permitting the operator to quickly grasp the status of the process being monitored and initiate any action which might be required to correct same.

BRIEF DESCRIPTION OF THE DRAWING

The single FIGURE of the drawing is a schematic drawing representing the apparatus of the invention.

DESCRIPTION OF THE PREFERRED EMBODIMENT

Referring now to the drawing where the illustration is for the purpose of describing the preferred embodiment of the present invention and is not intended to limit the invention hereto, the figure is a schematic diagram of a control system 10 that produces three-dimensional holographic displays which, for example, can be used instead of the two-dimensional displays typically used in the control room of a process control installation.

In the control system 10 illustrated in the FIGURE, a computer 12 is utilized to generate graphics which are transmitted to a projection television receiver 14 which is connected thereto and which produces an image having a high frame rate and high intensity. The input devices connected to the computer 12 include, but are not limited to, an optical disc system 16, a video camera system 18 and a process control system 20. Image data for the graphics to be generated by the computer 12 are stored in the optical disc system 16. Typically, the image data stored in the optical disc system 16 have already been calculated or previously determined and are retrieved from this disc system 16 by the computer 12 for modification purposes and/or transmission to the television receiver 14. The video camera system 18 may be used to obtain image information about particular parameters such as the physical layout of the plant or facility which the control system 10 is monitoring. Such image information might include the height of piles of raw material within the plant, the depth of beds in recovery boilers, etc., if a power generation plant is involved. The foregoing image information is transmitted to the computer 12 which, in turn, may modify same prior to transmission to the television receiver 14. It should be noted that the output of the video cameras can be digitized and used as part of the display on the television receiver 14. In addition, wide angle camera coverage can be generated from dual (stereopticon type) video camera systems for transmission to the computer 12 for display purposes. The process control system 20 generates information as to process variables and the status of the system being controlled, and these data are transmitted to the computer 12 so that they can be shown on the projection television receiver in real time. In this manner, process variable information can be superimposed on the television receiver image in real time, and such process variable information can be shown as a digital display or by color-coded overlays. It should be noted that even though the optical disc system 16, the video camera system 18 and the process control system 20 have been discussed as input devices to the computer 12, each of these systems can also be controlled by the computer 12, i.e., the graphics image data, after modification by the computer 12, can be transmitted to the optical disc system 16 for storage purposes; the operation of the video camera system 18 can be controlled by the computer 12; and the process control variables can be changed by the computer 12.

In addition to the foregoing input devices, a keyboard 22 and a voice recognition system comprising a microphone 24 and a voice recognition device 26 are provided and connected as inputs to the computer 12. In this manner, data can be entered into the control system 10 by the operator via the keyboard 22 and/or the voice recognition system. The use of the voice recognition system frees the operator for other work and allows several displays to be selected from one central location without the operator having to move to individual consoles.

As previously stated, the computer 12 is utilized to generate graphics which are transmitted to the projection television receiver 14. A spinning lens device 28 is positioned in front of the television receiver 14 and transforms the two-dimensional image shown thereon into a three-dimensional holographic image and projects same into free space in front of the spinning lens device 28. A lens control device 30 interconnects the computer 12 to the spinning lens device 28 and regulates the rotation of the spinning lens device 28 so as to be in synchronization with the image information being transmitted by the computer 12 to the projection television receiver 14. A three-dimensional viewing input device 32, which includes a light pen 34, is used to "interconnect" the resulting three-dimensional holographic display to the computer 12. By positioning the tip of the light pen 34 at a particular desired point in the three-dimensional holographic display and by giving a voice command for interception by the microphone 24 or by pressing a button on the pen 34, a beam of light is produced at the top of the pen 34. The three-dimensional viewing input device 32 locates the light pen 34 by "sighting" on the emitted beam of light and transmits its location to the computer 12 which, in turn, compares this point with the calculated image for same and takes the requested action with respect to the point in question.

Operationally, the holographic display generated in free space in front of the spinning lens device 28 may be selected for different areas of the facility or portions of the process control system being monitored and/or regulated. The image generated by the computer 12 and transmitted to the projection television receiver 14 results in a high intensity, high frame rate two-dimensional image to be shown thereon. This two-dimensional image is, in turn, transformed into a three-dimensional, fully updatable holographic display in free space by the spinning lens device 28. The operator can interact with this display through the keyboard 22, the voice recognition device 26 via the microphone 24, or the light pen 34. In this manner, the operator can change or modify the three-dimensional holographic display for example, by rotating same, decreasing or enlarging its size to show detail, etc. In addition, process variable information can be superimposed on the display at the location of the actual process variable measurement being monitored in real time. Such superimposed process variable information can be a digital display or may be in the form of a color-coded overlay, such as for the level of a tank, etc. Alternatively, temperature may be displayed in different colors representing different temperature ranges. In this manner, the operator can quickly and easily obtain an overview of the overall system being controlled and take any action which might be required.

Certain modifications and improvements will occur to those skilled in the art upon reading the foregoing. It should be understood that all such modifications and improvements have been deleted herein for the sake of conciseness and readability but are properly with the scope of the following claims.

We claim:

1. An apparatus for producing a three-dimensional display in free space, comprising:
   a projection television receiver for displaying a high intensity, high frame rate two-dimensional image thereon that is updatable in real time;
   means for providing real time data, indicative of the status of a system being controlled;
   a computer, connected to the projection television receiver, for processing graphics image data and said real time data and transmitting same to the projection television receiver;
   a spinning lens device, positioned in front of the projection television receiver, for transforming the two-dimensional image thereon into a three-dimensional display and projecting same into free space;
   means for modifying said display; and
   a lens control device, connected to the computer and to the spinning lens device, for regulating the rotation of the spinning lens device so as to be in synchronization with the data being transmitted by the computer to the projection television receiver.

2. The apparatus as defined in claim 1 further including a three-dimensional viewing input device connected to a light pen and to the computer for viewing the three-dimensional display and allowing an operator to interact with the display.

3. The apparatus as defined in claim 2 further including an optical disk system, connected to the computer, for storing graphics image data that can be retrieved by the computer.

4. The apparatus as defined in claim 2 further including means for determining the position of a specific location of a beam of light in said display produced by the light pen and comparing the location of the beam of light with the display.

5. The apparatus as defined in claim 1 further including a video camera system, connected to the computer, for obtaining image information about particular parameters of the system being controlled.

6. The apparatus as defined in claim 1 wherein actuation of said modifying means permits varying the size of said display.

7. The apparatus as defined in claim 1 wherein actuation of said modifying means permits varying the orientation of said display.

8. The apparatus as defined in claim 1 further including a keyboard, and a microphone connected to a voice recognition device, for entering data into the computer.

9. An apparatus for producing a three-dimensional display in free space, comprising:
   a projection television receiver for displaying a high intensity, high frame rate two-dimensional image thereon that is updatable in real time;
   means for providing real time data, indicative of the status of a system being controlled;
   a computer, connected to the projection television receiver, for processing graphics image data and said real time data and transmitting same to the projection television receiver;
   a spinning lens device, positioned in front of the projection television receiver, for transforming the two-dimensional image thereon into a three-dimensional display and projecting same into free space;
   a three-dimensional viewing input device connected to a light pen and to the computer for viewing the three-dimensional display and allowing an operator to interact with the display; and a lens control device, connected to the computer and to the spinning lens device, for regulating the rotation of the spinning lens device so as to be in synchronization with the data being transmitted by the computer to the projection television receiver.

10. An apparatus for producing a three-dimensional display in free space, comprising:

a projection television receiver for displaying a high intensity, high frame rate two-dimensional image thereon that is updatable in real time;

means for providing real time data, indicative of the status of a system being controlled;

a computer, connected to the projection television receiver, for processing graphics image data and said real time data and transmitting same to the projection television receiver;

a spinning lens device, positioned in front of the projection television receiver, for transforming the two-dimensional image thereon into a three-dimensional display and projecting same into free space;

a three-dimensional viewing input device connected to a light pen and to the computer for viewing the three-dimensional display and allowing an operator to interact with the display;

means for determining the position of a specific location of a beam of light in said display produced by the light pen and comparing the location of the beam of light with the display; and a lens control device, connected to the computer and to the spinning lens device, for regulating the rotation of the spinning lens device so as to be in synchronization with the data being transmitted by the computer to the projection television receiver.

11. An apparatus for producing a three-dimensional display in free space, comprising:

a projection television receiver for displaying a high intensity, high frame rate two-dimensional image thereon that is updatable in real time;

means for providing real time data, indicative of the status of a system being controlled;

a computer, connected to the projection television receiver, for processing graphics image data and said real time data and transmitting same to the projection television receiver;

a spinning lens device, positioned in front of the projection television receiver, for transforming the two-dimensional image thereon into a three-dimensional display and projecting same into free space;

a video camera system, connected to the computer, for obtaining image information about particular parameters of the system being controlled; and a lens control device, connected to the computer and to the spinning lens device, for regulating the rotation of the spinning lens device so as to be in synchronization with the data being transmitted by the computer to the projection television receiver.

12. An apparatus for producing a three-dimensional display in free space, comprising:

a projection television receiver for displaying a high intensity, high frame rate two-dimensional image thereon that is updatable in real time;

means for providing real time data, indicative of the status of a system being controlled;

a computer, connected to the projection television receiver, for processing graphics image data and said real time data and transmitting same to the projection television receiver;

a spinning lens device, positioned in front of the projection television receiver, for transforming the two-dimensional image thereon into a three-dimensional display and projecting same into free space;

a keyboard, and a microphone connected to a voice recognition device, for entering data into the computer connected thereto; and a lens control device, connected to the computer and to the spinning lens device, for regulating the rotation of the spinning lens device so as to be in synchronization with the data being transmitted by the computer to the projection television receiver.

* * * * *